United States Patent Office 3,359,076
Patented Dec. 19, 1967

3,359,076
PRECIPITATION OF POTASSIUM HALIDES FROM MIXED BRINES USING ORGANIC SOLVENTS
Remigius A. Gaska, Midland, Mich., assignor to The Dow Chemical Company, Midland, Mich., a corporation of Delaware
No Drawing. Filed Jan. 31, 1964, Ser. No. 341,731
5 Claims. (Cl. 23—300)

This invention relates to the separation and recovery of potassium halides from brine and, more particularly, is concerned with the recovery of potassium halides, particularly potassium chloride, from aqueous solutions containing potassium halides, sodium chloride, calcium chloride and/or other inorganic halides by the addition of the brine solution to a low molecular weight polar, Lewis base-type solvent and the subsequent separation of the potassium halides from the solution.

Potassium chloride finds utility as an electrolyte in the electrolytic production of potassium hydroxides using the mercury-chlorine cell. However, to be suitable for this particular utility, the potassium chloride by customer's demand must contain less than 0.3 percent by weight sodium chloride.

In a copending U.S. patent application Ser. No. 296,-429, entitled, "Recovery of Potassium Halides from Brine," filed July 22, 1963, now U.S. Patent 3,231,340, I have set forth a method whereby potassium halides, especially potassium chloride, are recovered from brine solutions by adding a low molecular weight, polar, Lewis base-type solvent to the brine solution thereby precipitating the potassium halide. The so-precipitated potassium halide is then separated from the remaining solution. The potassium halide product of the process of the copending application as produced is found to contain considerably more than 0.3 percent by weight sodium halides. By evaporating the original brine solution prior to adding the solvent thereto, a good portion of the sodium halides can be precipitated out prior to the desirable potassium halide precipitation. However, detrimental amounts, i.e., greater than about 0.3 weight percent of sodium halides still remain in solution and will coprecipitate with the potassium halide. Washing the potassium halide product to remove the sodium halides to give a potassium halide containing less than 0.3 percent sodium halides has been quite unsuccessful due to inability of the wash liquor to remove the sodium halides which ordinarily is occluded between or within the potassium halide crystals.

The term "sodium halides," as used herein, is meant to include sodium chloride and sodium bromide.

I have unexpectedly discovered an improvement in my method desribed in U.S. patent application Ser. No. 296,429 now U.S. Patent No. 3,231,340 wherein by adding the brine to the solvent, or admixing the brine and solvent simultaneously, the amount of sodium chloride coprecipitated with the potassium halide product is less than 0.3 percent by weight and further, the small residual amount of sodium chloride is easily washed out and separated from the desired potassium halide product.

It is a principal object of the instant invention to provide an improved method for recovering from brine directly a potassium halide product which is substantially free of sodium chloride and other impurities.

It is an additional object to provide an improved method which produces a potassium halide product which is capable of being washed free of substantially any impurities, including sodium chloride, present therein.

A further object is to provide an improved method for producing a potassium chloride product which contains less than 0.3 percent by weight sodium chloride without the need for expensive recrystallization steps.

Other objects and advantages of the improved method of the instant invention will become apparent from the following detailed description thereof.

The improved method of this invention is comprised of adding a brine solution containing the potassium halide which is to be recovered to a low molecular weight, polar, Lewis base-type solvent thereby precipitating the potassium halide, and then separating from the resulting solution the potassium halide so precipitated.

In practicing the method of this invention in recovering potassium chloride from the brine solution containing, fo rexample, potassium chloride, calcium chloride, magnesium chloride, sodium chloride, lithium chloride and strontium chloride, the brine solution is added to the specified solvent in amount sufficient to bring about the precipitation of the potassium chloride. Alternatively, the brine and solvent can be mixed substantially simultaneously in a reaction vessel to bring about the precipitation of the potassium chloride. The mixture is stirred, for example, by mechanical means. The resulting precipitate of potassium chloride is then separated from the so-treated solvent by filtration or other means known in the art. The separated precipitate may be further purified, if desired, by washing with water and/or additional amounts of the specified solvent to remove any residual brine adhering to the precipitate and said precipitate subsequently be dried.

In general, in order for the brine to be suitable for use in the method of this invention, initially all the halides therein should be in solution although undissolved potassium halide may be present, and it should initially contain in solution at least 0.6 percent by weight potassium halides (e.g., potassium chloride and/or potassium bromide) and at least 20 percent by weight calcium halides (e.g., calcium chloride) and/or strontium halides and/or magnesium halides (e.g., magnesium chloride).

As the temperature of the brine solution is lowered, a larger proportion of the potassium halides is recoverable. As the temperature is raised, a smaller proportion of the potassium halides is recoverable, but the precipitate contains less impurities, e.g., sodium chloride. In general, suitable temperatures to be employed are normal ambient temperatures.

Where the initial brine solution contains undissolved potassium halides, calcium chloride, magnesium chloride and/or other halides, or where the potassium halides, calcium chloride, magnesium chloride and/or metallic halides comprise an anhydrous mixture, it is preferable that a quantity of water be added to the initial mixture in an amount such that all halides other than potassium halides will be in solution before initiating the method. This procedure aids in the recovery of a product substantially free of impurities.

In many brines, sodium chloride will be present in amounts equal to or greater than that of the potassium halides. A good portion of the sodium chloride may be removed by evaporating the brine solution containing the sodium chloride along with the potassium halides, magnesium chloride and calcium chloride until the sodium chloride precipitates out of the solution.

Preferably, the feed brine, prior to the addition of the low molecular weight, polar, Lewis base-type solvent, should be saturated with respect to calcium chloride and/or magnesium chloride and/or potassium halides.

Where the initial brine solution is found to be below saturation with respect to potassium halides and/or calcium chloride and/or magnesium chloride, the brine may be concentrated by evaporation until these aforesaid components have reached the desired concentration or have at least approached saturation of the initial aqueous solution with respect to the potassium halides and/or calcium chloride and/or magnesium chloride.

Solvents suitable for use in the method of the present invention include low molecular weight alcohols (e.g., methanol or ethanol), ketones (e.g., acetone), amides (e.g., dimethyl formamide), polyols (e.g., ethylene glycol), acetates and other low molecular weight, polar, Lewis base-type solvents which are, in part, at least partially miscible with said aqueous brine solutions. Preferred solvents are those having the lowest molecular weights, e.g., methanol, ethanol.

It is preferable to use at least an amount of the solvent which brings the system to saturation with respect to the potassium halide. These amounts may be from as much as 50 percent of the weight of the brine to as little as between 20 and 40 percent of the brine weight.

After the separation of the potassium halides, the solvent may be recovered, if desired, from the filtrate by vaporization, liquid phase separation techniques or other known means.

The following example serves to further illustrate the method of the present invention.

EXAMPLE

*Run A.*—About 7838 grams of a brine containing about 39.6 percent $CaCl_2$, about 0.47 percent NaCl and about 2.66 percent KCl, and the remainder water were added to 4793 grams of methanol thus giving a methanol concentration of 38 percent by weight of the total methanol and brine solution present. The resulting mixture was stirred for about 2 hours at about 25° C.

A precipitate thereby formed and was separated from the filtrate by filtration. The wet precipitate so formed weighed about 240 grams. After filtering off the precipitate, said precipitate was analyzed and found to contain only 0.28 percent by weight NaCl on a dry basis. The potassium chloride recovered in the precipitate was about 76.7 percent by weight of that in the original brine solution.

The final product of the present improved method can be washed, if desired, with methanol, e.g., from about 0.5 to about 6 grams of methanol per gram of unwashed product to produce a potassium halide product containing less than about 0.2 percent NaCl. A methanol-water solution can also be used as wash solvent.

*Control.*—About 430 grams of methanol was added to about 1000 grams of brine having a composition similar to that of the brine in Run A described directly hereinbefore to give a methanol concentration of 30 percent by weight of the total methanol and brine solution present. The resulting mixture was stirred as in Run A.

A precipitate formed and was separated from the solution by filtration. The wet precipitate so formed weighed about 28.3 grams and was found to contain 4.32 percent by weight NaCl on a dry basis. The potassium chloride recovered was about 74.9 percent by weight of that in the original brine solution.

Washing the precipitate using about 1.0 gram of methanol per gram of unwashed precipitate and then water (about 0.23 gram of water per gram of unwashed precipitate) did not lower the sodium chloride content in said precipitate below the 0.3 weight percent level.

It is readily seen that in Run A utilizing the improved process of the instant invention, only about 0.28 percent by weight NaCl was found in the final product of potassium chloride. However, in the control, about 4.32 percent by weight NaCl was found in the final product.

In a manner similar to that described for the preceding example, potassium halides, including, for example, potassium chloride and/or potassium bromide containing less than about 0.3 percent NaCl can be recovered from brines by the addition of said brines to a low molecular weight, polar, Lewis base-type solvent, e.g., methanol, ethanol, acetone, dimethyl formamide, ethylene glycol and acetates and the subsequent separation of said potassium halide from the remaining solution.

Various modifications can be made in the instant invention without departing from the spirit or scope thereof, for it is to be understood that I limit myself only as defined in the appended claims.

What is claimed is:

1. In a method for separating potassium halides from an aqueous solution containing potassium halides, sodium halides and at least one of the chlorides of the group consisting of calcium chloride and magnesium chloride by contacting said solution with a low molecular weight, polar, Lewis base-type solvent selected from the group consisting of methanol, ethanol, acetone, dimethyl formamide and ethylene glycol, the improvement which comprises:

(a) adding said aqueous solution to said solvent in an amount to provide a system wherein the solvent ranges from about 20 to about 50 percent of the weight of said aqueous solution, said solvent being at least partially miscible with said aqueous solution, thereby to precipitate the potassium halides having low amounts of sodium halides impurities associated therewith; and (b) separating the so-precipitated potassium halides containing low amounts of sodium halides from said solution.

2. The method according to claim 1 wherein said initial aqueous solution contains at least 20 percent by weight calcium chloride.

3. The method according to claim 1 wherein said initial aqueous solution contains at least 0.6 percent potassium halides.

4. In a method for separating potassium chloride from an aqueous solution containing potassium chloride, sodium chloride and calcium chloride by contacting said solution with methanol, the improvement which comprises:

(a) adding said aqueous solution and methanol substantially simultaneously to a reaction vessel thereby to precipitate potassium chloride, the amount of methanol ranging from about 20 to about 50 percent of the weight of said aqueous solution; and (b) separating the so-precipitated potassium chloride containing low amounts of sodium chloride from said solution.

5. The process as defined in claim 1 wherein the solvent is methanol.

References Cited

UNITED STATES PATENTS

| 2,002,797 | 5/1935 | Reich | 23—312 X |
| 3,212,863 | 10/1965 | Goodenough | 23—300 |
| 3,231,340 | 1/1966 | Gaska | 23—302 X |

FOREIGN PATENTS

| 331,236 | 6/1930 | Great Britain. |
| 285,173 | 5/1931 | Italy. |

OTHER REFERENCES

Gilliot, Bull. Soc. Chem. France, M. 1951, pp. 992 to 1002.

Seidell, Solubilities of Inorganic and Organic Compounds, vol. 1, New York, 1919, pp. 196 to 197, 524 to 525, and 645 to 648.

NORMAN YUDKOFF, *Primary Examiner.*

WILBUR L. BASCOMB, JR., *Examiner.*

S. J. EMERY, *Assistant Examiner.*